(12) United States Patent
Ramin et al.

(10) Patent No.: US 8,976,044 B2
(45) Date of Patent: Mar. 10, 2015

(54) TRANSIT STATION GEOGRAPHICAL LOCATION SIGN WITH HANDICAP ACCESS

(75) Inventors: Safavi Ramin, Plano, TX (US); Scott R. Watters, Plano, TX (US); Marty Masias, Van Alstyne, TX (US)

(73) Assignee: Luminator Holding, L.P., Plano, TX (US)

( * ) Notice: Subject to any disclaimer, the term of this patent is extended or adjusted under 35 U.S.C. 154(b) by 103 days.

(21) Appl. No.: 13/458,804

(22) Filed: Apr. 27, 2012

(65) Prior Publication Data

US 2013/0285842 A1   Oct. 31, 2013

(51) Int. Cl.
*G08G 1/123* (2006.01)

(52) U.S. Cl.
USPC ........... 340/994; 340/991; 340/992; 340/993; 340/539.17; 340/989; 701/2; 701/412; 701/468; 701/485; 701/517; 455/456.1; 455/456.2; 455/456.3; 455/412.2; 379/88.11; 379/88.12; 379/912; 379/913

(58) Field of Classification Search
CPC ...... G08G 1/127; G08B 25/00; G09B 21/006; E01F 9/00
USPC .................................................. 340/991, 994
See application file for complete search history.

(56) References Cited

U.S. PATENT DOCUMENTS

| | | | |
|---|---|---|---|
| 5,739,774 A * | 4/1998 | Olandesi ....................... 340/994 |
| 6,374,176 B1 * | 4/2002 | Schmier et al. ............... 701/465 |
| 6,763,299 B2 * | 7/2004 | Jones ............................. 701/465 |
| 7,171,220 B2 * | 1/2007 | Belcea .......................... 455/457 |
| 7,489,939 B2 * | 2/2009 | Ashley et al. .............. 455/456.6 |
| 7,643,938 B2 * | 1/2010 | Adachi et al. ................. 701/468 |
| 8,606,431 B2 * | 12/2013 | Kim ................................. 701/2 |
| 2004/0075602 A1 * | 4/2004 | Griesau et al. ................ 341/176 |
| 2007/0274420 A1 * | 11/2007 | Billings ........................ 375/344 |
| 2010/0253549 A1 * | 10/2010 | Kim et al. ..................... 340/994 |
| 2013/0234868 A1 * | 9/2013 | Koth ............................. 340/994 |

FOREIGN PATENT DOCUMENTS

| | | | |
|---|---|---|---|
| JP | 2011-227550 | * | 11/2011 |
| JP | 2011227550 A | | 11/2011 |
| KR | 10-2004-0039610 | * | 5/2004 |
| KR | 20040039610 A | | 5/2004 |
| KR | 20-2006-0015386 | * | 8/2006 |
| KR | 200424389 Y1 | | 8/2006 |
| KR | 200449990 Y1 | | 9/2010 |
| KR | 20110052065 A | | 5/2011 |

OTHER PUBLICATIONS

Patent Cooperation Treaty: International Search Report of Written Opinion for related PCT/US2013/028883; Sung Chul Kang; Jun. 4, 2013; 10 pages.

* cited by examiner

*Primary Examiner* — Firmin Backer
*Assistant Examiner* — Adnan Aziz
(74) *Attorney, Agent, or Firm* — Howison & Arnott, LLP

(57) ABSTRACT

A transit stop destination sign is provided that communicates wirelessly with a central transit system server over a wireless network, determines its GPS location and provides the same to the central transit system server, and provides both an updated visual destination sign display as well as an audio button for visually impaired that provides updated destination information in a natural language.

14 Claims, 5 Drawing Sheets

TRANSIT STATION GEOGRAPHICAL LOCATION SIGN WITH HANDICAP ACCESS

TECHNICAL FIELD

Embodiments of the invention relate to transit destination or shelter signs and in particular, embodiments of the invention provide a transit station or shelter sign adapted to determine its geographical location and provide the transit patrons an updated visual estimation of a next transit vehicle arrival and visually impaired patrons an on-demand audible transcription of updated transit vehicle arrival information.

BACKGROUND

In the past a transportation system patron reviewed a printed schedule to determine when the next transportation vehicle for a specific route was supposed to arrive at a specific transit station or shelter. The patron would carefully time themself so as to arrive at the specific transit station or shelter minutes before the transit vehicle was to arrive so as not to miss the transit vehicle. If the transit vehicle was running late, the patron may find himself waiting at the transit station or shelter for a longer period of time than anticipated. In inclement weather, during heavy traffic periods or road construction situations, the transit patron has a limited ability to determine when or if the expected transit vehicle will arrive. Furthermore, if the transit route has changed since the printing of the printed schedule or if the transit patron has an old version of the transit schedule, then the transit patron may have no idea that the transit route that they are waiting on has changed or been moved to a different station and will no longer arrive at the particular transit station or shelter that the transit patron is waiting at.

What is needed is a transit system signage device and system that provide visual transit route next arrival information at each transit station or shelter. Such a visual transit route sign would be more helpful if it could provide updated next transit vehicle arrival information for each route that stops at a particular transit shelter or station.

Presently, if a visual information sign is installed at a transit station, a network system has to be programmed to wirelessly communicate with that sign in order to provide updated information. The network transit system must be programmed by a transit system staff to provide an identifier of the specific sign and the sign's specific location (i.e., the specific transit station or transit shelter) where the transit route display sign is located.

What is needed is a transit sign that provides its location to the central system along with its identification number so that when a new sign or replacement transit shelter or station sign is installed the system can update itself and provide the proper information to the newly installed sign based on the location that the sign provides to the transit network system.

Additionally, various patrons of a transit system are visually impaired. Visually impaired patrons may not be able to read the transit signs located at transit stations or shelters regardless of what is posted on those signs. What is needed is a means for visually impaired transit patrons to receive updated information about the arrival times of a next transit vehicle for a specific route. Furthermore, it would be advantageous for a visually impaired transit patron to further be able to receive updated information about transit vehicles that are running late so that the visually impaired may not be required to withstand the outside elements for a longer period of time than necessary. Instead, they can seek other shelter while having a better idea of when the next transit vehicle for the route they're interested in will arrive at the specific transit station or shelter.

SUMMARY

Embodiments of the invention provide a transit stop destination sign that communicates wirelessly with a central transit system server over a wireless network, determines its GPS location and provides the same to the central transit system server, and provides both an updated visual destination sign display as well as an audio button for visually impaired that provides updated destination information in a natural language.

An embodiment provides a destination sign that includes a microcontroller. A wireless communication module, connected to the microcontroller, is adapted to transmit and receive data on a wireless network. An antenna is connected to the wireless communication module. A display circuit and display panel is adapted to display display data that is provided by the microcontroller. There is an audio amp and speaker that is adapted to produce audible sound in accordance with audio data that is provided by the microcontroller. Also, an audio button is connected to provide a signal to the controller when switched by a person. The controller is adapted to provide audio data to the audio amp and speaker when the audio button is switched. In addition, the audio data is used to produce an audible transcription of at least part of the display data.

Additional embodiments include a GPS module adapted to determine a geographical location of the destination sign. Various embodiments include a memory adapted to store a unique identification data associated with the destination sign and transit route data, which may be received by the wireless communication module.

In various embodiments, the microcontroller is adapted to provide the transit route data as audio data to the audio amp when the audio button is switched a first number of times. Also, the memory can be adapted to store alert data received from the wireless communication module.

Another embodiment of the invention provides a method of installing a destination sign in a transit system, wherein the transit system has a centralized transit system control center. The exemplary method for installing the destination sign includes assigning a unique identification data to the destination sign; entering the unique identification data and a predetermined geographical location data into the transit system control center; placing the destination sign at a first geographical location; determining, by a GPS module in the destination sign, a first present geographical location of the destination sign; transmitting, by the destination sign via a wireless network to the transit system control center, the unique identification data and the first present geographical location of the destination sign; and receiving, by the destination sign via the wireless network from the transit system control center, an indication of whether the first present geographical location of the destination sign is substantially similar to the predetermined geographical location. In this embodiment, when the indication indicates that the first present geographical location is substantially similar to the predetermined geographical location, then the destination sign receives route information via the wireless network; displays the route information on the destination sign for patrons to read; and provides, by a audio module in the destination sign, an audible natural language transcription of the route information when a when a designated button associated with the destination sign is switched a first predetermined number of times by a transit patron.

In another exemplary method of installing a destination sign, when the indication indicates that the first present geographical location is not substantially similar to the predetermined geographical location, then the destination sign is moved to a second geographical location; the GPS module in the destination sign determines a second present geographical location of the destination sign. The unique identification data and the second present geographical location of the destination sign is transmitted by the destination sign via the wireless network from the transit system control center; and then receiving by the destination sign an indication of whether the second present geographical location of the destination sign is substantially similar to the predetermined geographical location. In this exemplary embodiment, when the indication indicates that the second present geographical location is substantially similar to the predetermined geographical location, then the exemplary destination sign receives route information via the wireless network; displays the route information on the destination sign for patrons to read; and provides an audible natural language transcription of the route information when a designated button associated with the destination sign is switched a first predetermined number of times.

Various destination signs receive alert information via the wireless network; display the alert information on the destination sign for patrons to read; and provide an audible natural language transcription of the alert information when a designated button associated with the destination sign is switched a second predetermined number of times.

Other embodiments transition the audio module from a first state to a paused state thereby disallowing additional audible natural language transcriptions for a predetermined amount of time when the designated button is switched at least a third number of consecutive times.

Further embodiments of an exemplary destination sign periodically check the present geographical location of the destination sign using a GPS module. Then present geographical location is compared with the previous or first geographical location in order to determine whether the destination sign has moved from the first geographical location. When it is determined that the destination sign has moved from the first geographical location, the destination sign transmits, via the wireless network, an alarm indication that provides the unique identification data and the present geographical location of the destination sign.

Another embodiment of the invention provides a destination sign adapted for installation at a transit vehicle stop. The exemplary destination sign has a display panel module adapted to display transit vehicle route information to transit patrons. There is an audio button associated with an audio module. The audio module produces an audible natural language transcription of the transit vehicle route information. Also, a wireless network communication module in the destination sign can receive transit vehicle route information. A controller module is connected to the display panel module, the audio button, the audio module and the wireless network communication module. The controller module comprises memory, wherein the memory is adapted to store a plurality of instructions that are configured to cause the controller module to perform a variety of functions. Such functions include displaying transit vehicle route information, received by the wireless network communication module, by the display module; producing, by the audio module, the audible natural language transcription of the transit vehicle route information on demand when the audio button is switched once; and setting the state of the audio module to a paused state for a predetermined amount of time when the audio button is switched more than a predetermined number of substantially consecutive times.

Additional embodiments of the destination sign include a GPS module adapted to determine the geographic location of the destination sign. Here, the plurality of instructions are further configured to cause the controller module to store the geographical location of the destination sign in memory; periodically compare the stored geographical location of the destination sign with a present geographical location of the destination sign; determine whether the destination sign has moved a distance greater than a predetermined amount from the stored geographical location; and transmit, via the wireless network communication module, an alarm signal along with a destination sign identification data and the present geographical location of the destination sign.

In various embodiments, the destination sign displays transit vehicle route information for a plurality of transportation routes serviced by the transit stop.

BRIEF DESCRIPTION OF THE DRAWINGS

Other objects, features and characteristics of the various embodiments of the present invention as well as methods of operation and functions of related elements of structure, and the combination of parts and economics of manufacture, will become apparent upon consideration of the following description and appended claims with reference to the accompanying drawings. All of the drawings form a part of this specification wherein like reference numerals designate corresponding parts in the various figures, in which:

DETAILED DESCRIPTION

Figure 1:
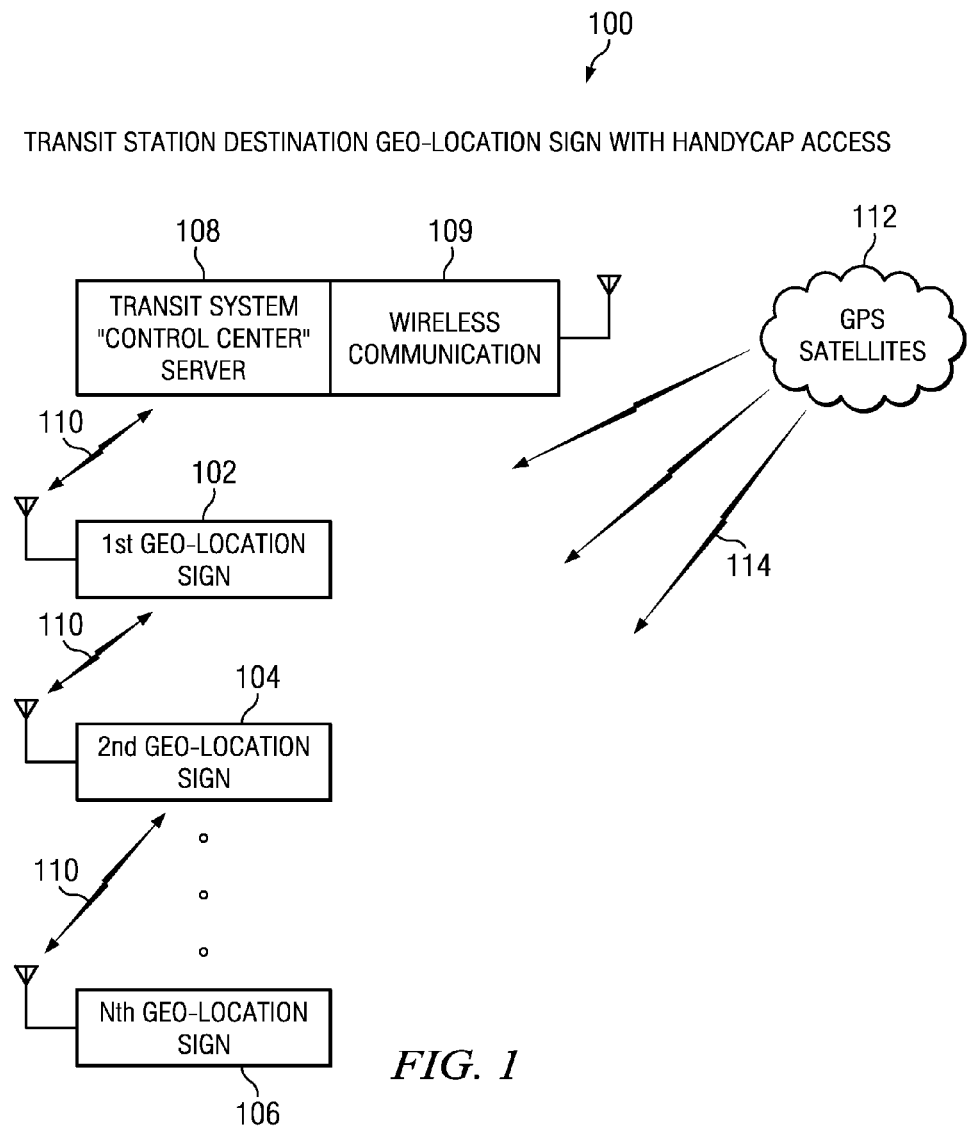
FIG. 1 is a high level diagram of an exemplary transit sign update system incorporating an exemplary geo-location destination sign.

Referring now to the drawings, wherein like reference numbers are used herein to designate like elements throughout, the various views and embodiments of an exemplary geo-location destination sign (geo-location sign) are illustrated and described. Other possible embodiments are also described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring to FIG. 1 a diagram of an exemplary transit sign information update system 100 is depicted. There are a plurality of transit stations and transit shelters where transit vehicles stop on their defined routes in order to pick up and drop off transit patrons. In an exemplary transit system a first geo-location sign 102 is installed at a transit stop or transit shelter at a location on a predetermined transit route. At other locations on the same transit route or other transit routes, there may be a $2^{nd}$ geo-location sign 104 through N geo-location signs 106 installed. Each geo location sign provides information to transit patrons with respect to the estimated arrival time of a next transit vehicle to the particular transit stop. Each of the geo-location signs 102, 104, 106 provide the route number and route of the vehicle that stops at the particular transit stop, the route destination and the next arrival time of a transit vehicle for that particular route number. Additional information may be provided to the transit patrons by each geo-location sign.

A transit system control center server ("control center") 108 comprises a server with a database and software adapted to keep track of the schedules in actual position of the various transit vehicles in a transit system. Such transit vehicles may include buses, trams, trolleys, trains, subway vehicles, monorails, or any known transportation vehicle for carrying passengers in accordance with a schedule on transportation route. The control center 108 may further comprise or be connected to the wireless communication electronics 109 so that the control center 108 can wirelessly communicate via a wireless telephone network paging network or other wireless communication system 110 with the plurality of geo-location signs 102, 104, 106. Furthermore, the control center 108 may also, via the wireless communication electronics 109, communicate wirelessly with a plurality of transportation vehicles (not specifically shown) operating on one or more routes within a transportation system.

A GPS satellite system 112 provides GPS satellite signals, which are received by each of the plurality of geo-location signs 102, 104, 106 in order to obtain position information. Methods and apparatus for obtaining GPS-base location information are well known in the art and will not be discussed herein. Each of the geo-location signs 102, 104, 106 provide their geographical location via the wireless communication system 110 to the control center 108 via the wireless communication electronics 109. The control center 108 keeps track of the location of the geo-location signs 102, 104, 106 in a database and notices whether these signs remain stationary or are moved from their previously recorded geographical location.

Figure 2:
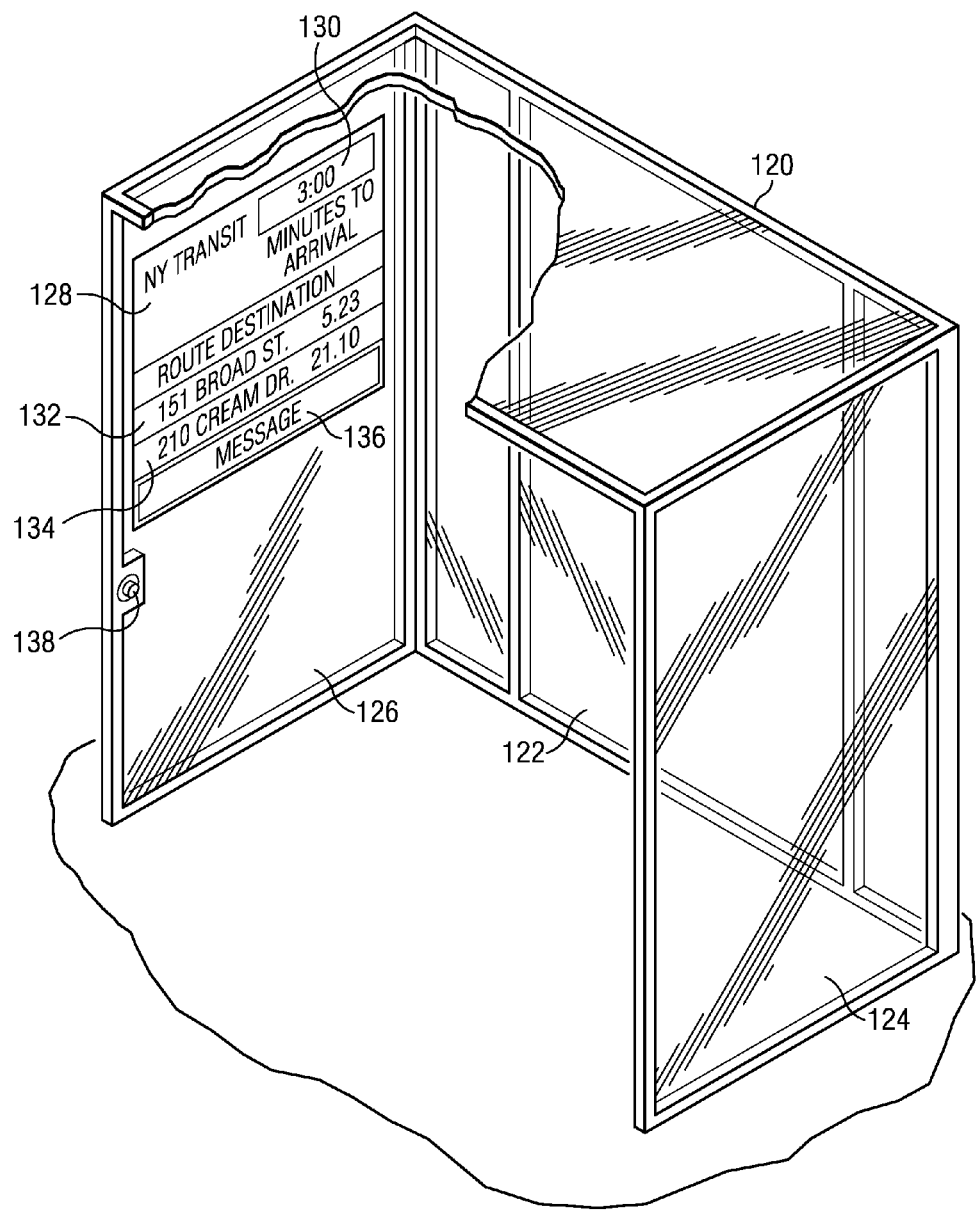
FIG. 2 is an exemplary transit shelter comprising an exemplary geo-location destination sign.

Referring now to FIG. 2 this figure depicts an exemplary transit shelter comprising an exemplary geo-location sign. A transit shelter 120 is shown having an opened front side, a backside wall 122, a right side wall 124, and a left side wall 126. In this embodiment, an exemplary geo-location sign 128 is mounted on the inside of the left side wall 126. The transit shelter 120 provides shelter for transit patrons who are waiting to board a particular transit vehicle that stops at the exemplary transit shelter 120.

The exemplary geo-location sign 128 provides the transit patrons with a variety of useful information. For example, at the top of the exemplary geo-location sign 128, the time of day is displayed 130. Other verbiage displayed on the displayed panel of the geo-location sign 128 is the route number, route name/route destination and the number of minutes until the next arrival or departure at the particular geographical location of the transit shelter 120. For example, the exemplary geo-location sign 128 depicted shows two transit routes that stop at this particular transit shelter 120, the first transit route 130 is route 51, which has a destination of Broad St. with the number of minutes until the next arrival to this particular transit station being five minutes and 23 seconds. Thus, the first transit route 130 depicts the route number, the destination name and the number of minutes until the next arrival or departure of a transit vehicle at the particular transit station 120. A second transit route 134 is displayed on the geo-location sign 128 as being route 210 having a destination of Green Dr., which will arrive in 21 minutes and 10 seconds. Additionally, exemplary geo-location sign 128 has a display area for a message 136. The message 136 may comprise one or more of a variety of messages that are sequentially displayed in the message area 136. The area messages displayed may be alerts related to service disruptions. Such alerts may include, but are not limited to, displaying delayed schedule information, weather alerts, service changes or additional connecting information.

In some embodiments, the entire display side of the geo-location sign 128 is either a dot matrix or LED display having a predetermined array of flip dots, LEDs or other display means such as LCD, liquid crystal or monitor style displays adapted to display the pertinent information for use by the transit patrons. In other embodiments, portions of the display side of the geo-location sign 128 comprise display areas specifically for displaying the time 130, the route, arrival time or minutes to departure 132, 134 and, or a message 136. The displays may be produced in green, multi-color or other American Disabilities Act (ADA) recommended display style and font size formats.

A transcribe button ("audio button") 138 is mounted in a predetermined visible location on or about the transit shelter 120. The transcribed button 138 may be a button, knob, lever switch or other single or multi-position switch located or positioned to be accessible by a visually impaired, handicapped or other transit patron who may have difficulty reading the information displayed on the geo-location sign 128. The transcribe button 138 provides the transit patron or user who presses or switches the transit button with an audible transcription of the verbiage displayed on the display panel portions of the geo-location sign 128. The audible transcription is provided on demand or substantially immediately after the pressing or switching of the transcribed button 138 by a transit patron. For example, the route information for the particular transit shelter is played audibly upon a first press or switch of the transcribe button 138. Here, the route, destination and minutes to departure for the first transit route 132 would be audibly played to the user in English or other language in a natural language sentence. For example, the first transit route display 132 may be turned to audio after an initial push of the transcribe button 138 as "route 51, destination Broad Street will arrive in 5 minutes and 23 seconds." Since this particular transit shelter services two routes, immediately after the first transit route 132 is read then the second transit route 134 will be transformed to audio in a similar fashion as, "route 210, destination Green Drive will arrive in 21 minutes and 10 seconds." Thus, when multiple transit routes stop at a particular transit station 120, the spoken audio transcribed route information for the particular geographic location of the transit shelter are played in next arrival time order.

Additionally, if the particular transit shelter or stop 120 connects a plurality of transit routes an exemplary geo-location sign may audibly announce all the connecting routes for the particular transit stop for example, the geo-location sign, may in addition to audibly announcing the route information in time of arrival order, it may also announce all the connecting routes for the transit stop or transit vehicle. For example, a geo-location sign 128 may announce something similar to, "this transit stop connects route 51 to Broad Street and route 210 to Green Drive. At transit stops where more routes are connected, the additional routes would of course be announced as well.

In addition to providing route information for the particular transit shelter geographical location, alert information pertinent to service disruptions or other valuable information that may be useful to a transit patron may also be audibly played by an exemplary geo-location sign 128. Such messages may be presented on the message display portion 136 of an exemplary geo-location sign 128. In other embodiments wherein there is no particular display designated for alerts or messages, the alert messages may be displayed following or inter leave with the route information being displayed. Examples of various exemplary alerts and messages that may be displayed on an exemplary geo-location sign 128 and/or provided audibly after actuating and exemplary transcribe button 138 are as follows.

1. Providing delayed schedule information:
   Display: route 45 to St. Charles Street delayed by 10 minutes. Next arrival in 22 minutes.
   Audible: Route 45 to St. Charles Street is delayed by 10 minutes. The next arrival will be in 22 minutes.
2. Moving of the transit stop:
   Display: This stop will relocate to 5200 block of Elm Street in 15 days.
   Audible: This transit stop will move to 5200 block of Elm Street in 15 days.
3. Weather alerts:
   Display: Freezing rain expected after 9 PM.
   Audible: Weather alert, freezing rain is expected today after 9 PM.
   Display: −12° F.
   Audible: The present temperature is −12° Fahrenheit.
4. Service changes:
   Display: Route 22 has been moved to $22^{nd}$ N. Windsor St.
   Audible: Route 22 no longer stops here, please go to $22^{nd}$ N. Windsor Street for Route 22.

Figure 3:
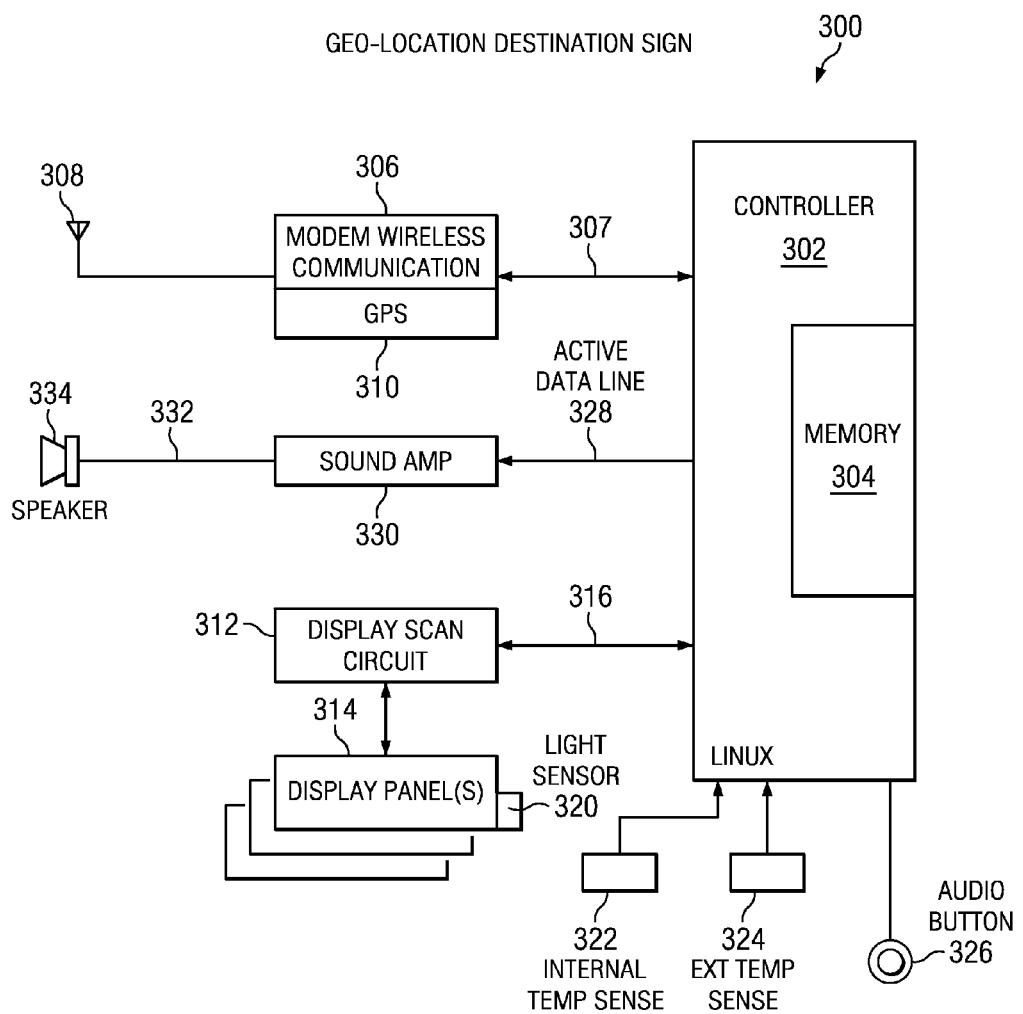
FIG. 3 provides an exemplary block diagram of an exemplary geo-location sign.

Referring now to FIG. 3 an exemplary block diagram of a geo-location destination sign in accordance with an embodiment of the invention is shown. The exemplary geo destination sign 300 comprises a controller or microprocessor device 302 that is used to control and perform various tasks based on instructions read from the memory 304. The memory 304 may be used by the controller 302 for storing location data or other data. Furthermore, the memory 304 may be able to store program instructions that are adapted to being read by the controller 302 and thereby enable the controller 302 to perform the necessary tasks or functions for controlling an exemplary geo-location destination sign 300. In various embodiments the memory 304 may be comprised of both static and/or dynamic memory. Furthermore, memory 304 may be comprised of flash, magnetic, solid state or electromechanical memory configurations and be large enough to accommodate the needs of an exemplary geo-location destination sign.

A wireless modem communication circuit 306 is in electrical communication with a controller via a line or bus 307. The wireless modem is connected to an antenna 308. The wireless modem 306 and antenna combination are adapted to send and receive data and information between an exemplary geo-location destination sign 300 and a transit system control center server 108 (see FIG. 1). A GPS circuit, which may be closely associated with the wireless modem communication circuit 306, may use a separate antenna (not specifically shown) or share the use of the wireless modem's antenna 308. The GPS circuit 310 determines the geographical location of an exemplary geo-location destination sign 300 by sensing multiple satellite positions and determining the geographical location therefrom. Per instructions from the controller, the wireless modem communication circuit may transmit the present geographical location of an exemplary geo-location destination sign 300 via the antenna 308 to the transit system control center server 108. Additionally, in some embodiments the GPS location determined by the GPS circuit 310 may be provided to the controller 102 and compared with an expected geographical location stored in memory 304. If the geographical location is close to or the same as the expected geographical location then no alarm signal is sent via the wireless modem 306 to the transit system control center server 108. Alternatively, if the geographical location determined by the GPS circuit 310 does not closely or approximately match the expected geographical location data stored in the memory 304 then an alarm signal along with the new geographical location may be provided to the wireless modem 306 and transmitted to the transmit system control center 108 to indicate that the exemplary geo-location destination sign has moved and to provide location information so that the exemplary geo-location destination sign can be tracked.

A display scan circuit 312 is connected between the controller 302 and one or more display panels 314. The display panels may have one or more lines that may each be able to display 20 to 30 characters. For example, the display panel 128 (see FIG. 2) comprises four lines that each display 20 to 30 characters. The display lines, in some embodiments, may comprise arrays of single or multicolored LEDs, liquid crystal displays, flip dot displays or HD displays that are adapted to be able to display characters that meet the American Disabilities Act (ADA) requirements for public transit vehicle signage. The display scan circuit 312 converts a display signal 316 received from the controller 302 into a signal that is used by the display panel 314. Associated with the display panels 314 may be a light sensor 320. The light sensor 320 senses the amount of ambient light in front of the display panel 314 and adjusts the brightness of the characters displayed on this display panel to help maximize the signage visibility.

In some embodiments, an internal temperature sensor 322 is positioned inside of the geo-location destination sign 300 to monitor the temperature inside the sign and check for over temperature or under temperature situations. The internal temperature sensor 322 is connected to the controller 302. The controller 302 may be further connected to a cooling fan (not specifically shown) that can be turned on and off depending on the internal temperature sensed by the internal temperature sensor 322.

An external temperature sensor 324 is mounted so as to sense the temperature outside of an exemplary geo-location destination sign 300 or around the transit stop location. The external temperature sensor 324 is connected to the controller 302 such that the controller 302 can convert the sensed temperature into temperature information that may be displayed on the display panels for patrons to view. The controller 302 will convert the sensed external temperature into digital data which is provided via the display line 316 to the display scan circuit 312 and thus displayed on, for example, the message portion of the display panel 314.

An audio button 326 is also connected to the controller 302. The audio button 326 may be used by a visually impaired transit patron who cannot read the writing displayed on the display panels 314. The audio button 326 is large enough and positioned in order to meet the ADA requirements for visually impaired transit patrons. A transit patron may press the audio button 326, which will provide a signal to the controller 302. A controller 302 will then provide audio data via an audio data line to a sound amp 330. The sound amp 330 will amplify the audio data (and in some embodiments convert the audio data from digital to analog data) and provide an amplified audio signal 332 to an output speaker 344. The output speaker 344 provides the user who pressed the audio button 326 with an audio transcription of the verbiage displayed on the display panel. The audio transcription is provided on demand by the transit patron who presses the audio button 326.

The number of presses of the audio button 326 may determine the audible transcription provided. For example in some embodiments, one press of the audio button 326 may provide route information for the transit stop location. Such route information would include the route number and name, the route destination and the next arrival time. The transcription would be read to the transit patron in English or another language as a natural language sentence. For example, the transcription heard through the audio speaker 334 may announce, "Route 37, destination James Street, next arrival 8 minutes." After announcing the route information for the transit stop location, an exemplary geo-location destination sign may discontinue addition transcription until pressed again or may continue transcribing any alert information or messages that are also being displayed on the display panel 314. In some embodiments, two presses of the audio button 326 in immediate sequence may skip the route information and begin immediately with the alert information for the particular transit stop or the transit system in general. Additionally, three presses in rapid sequence may inform the controller to turn off the audio or turn off the audio for 10 seconds and disable the button before allowing a next button press. Such disablement of the audio button for 10 seconds may be used to disinterest an avid button pusher such as a child or frustrated passenger.

Figure 4:
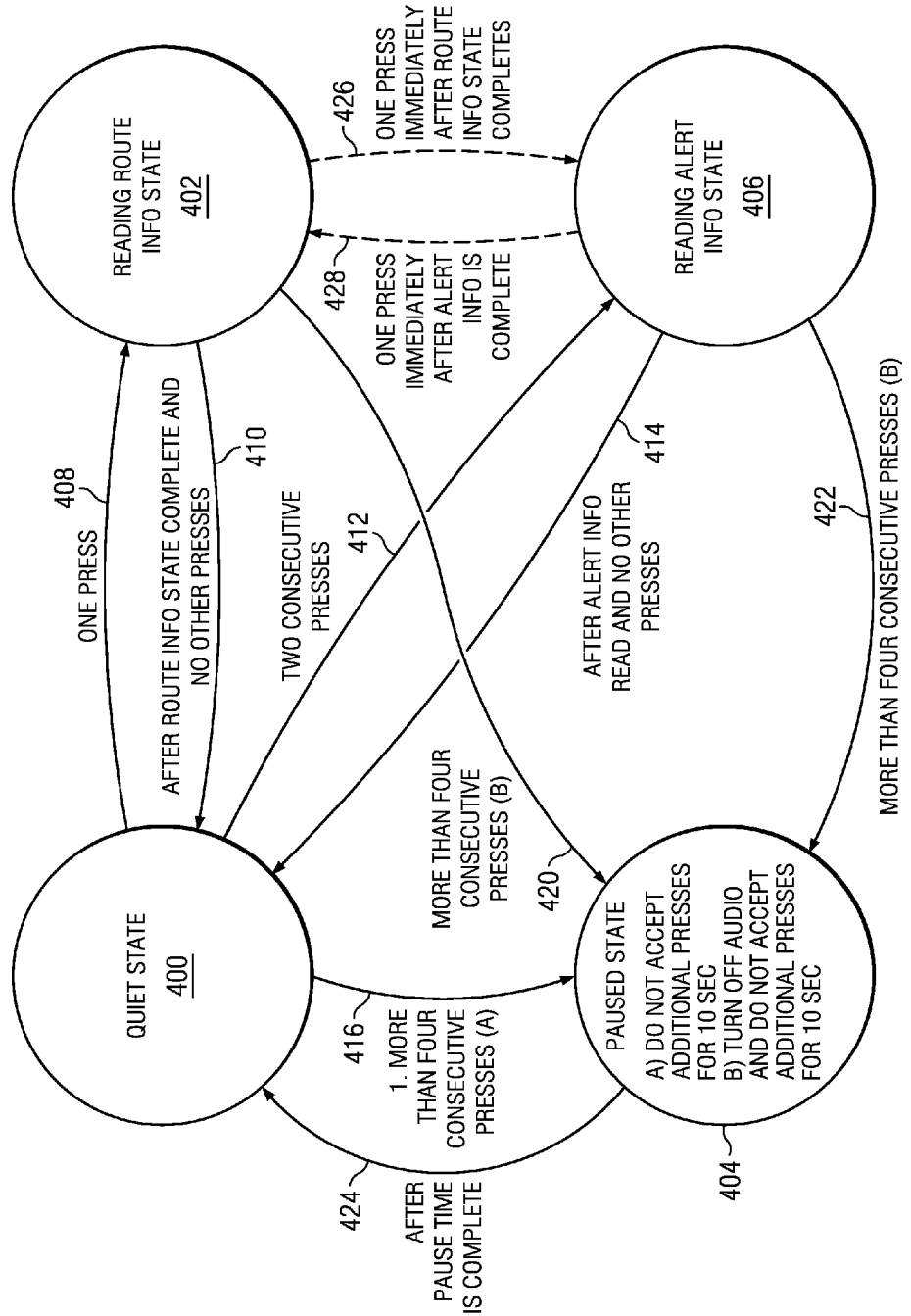
FIG. 4 provides a state diagram of various operational states of an exemplary geo-location sign.

As such, there are basically 4 audio states in which an exemplary geo-location destination sign 300 will operate. Referring now to FIG. 4 a state diagram showing the various audio states and transitions between the states available to an exemplary geo-location destination sign. The 4 states include a quiet state 400, a reading route info state 402, a reading alert info state 406, and a paused state 404. In the quiet state 400, the audio button 326 has not been pressed and no transcription of the display sign is being audibly produced at the output speaker 324. The reading route info state 402 is the state where the controller provides the route information via the audio data line 328 so that it is amplified by the sound amp 330 and the audio transcription is provided at the output speaker 334. The third state the reading alert info state 406, is similar to the route info state 402 except that the alert info is transcribed and provided audibly via the output speaker 334. Finally, the fourth state, the paused state 404 is a state where the controller does not accept any additional presses of the audio button 326 for a predetermined amount of time, for example for 10 to 15 seconds.

Referring to the quiet state 400, if the audio button 326 is pressed once then the quiet state 400 will change to the reading route info state 402 via transition line 408. After the route information has been read in the reading route information state 402, then the state will change back to the quiet state via the transition line 410. If there were two consecutive presses of the audio button 326, then the quiet state 400 will transition via transition line 412 to the reading alert info state 406 wherein the alert information is transcribed in audio form by an exemplary embodiment. After the alert information is read, then the reading alert information state 406 will transition via transition line 414 back to the quiet state 400. If the audio button 326 is pressed more than four consecutive times while in the exemplary embodiment is in either the quiet state 400, the reading route information state 402 or the reading alert information state 406 then the exemplary embodiment will transition via transition lines 416, 420 and 422 to the paused state 404. The transitions 420 and 422 will occur only after reading the route information or reading the alert information respectively. When an exemplary embodiment is in the pause state, the controller does not accept any additional presses for a predetermined amount of time, for example 10 to 15 seconds. In some embodiments the audio will be immediately turned off and will not accept additional presses for a predetermined amount of time, for example 5 to 10 seconds.

After the predetermined amount of time designated in the paused state 404 passes, the exemplary embodiment will transition via transition line 424 back to the quiet state 400.

In some embodiments, while the embodiment is in the reading route information state 402 and a transit passenger presses the audio button 326 once, then after reading the route information in the route information state 402, the audio state will transition via transition line 426 and begin reading the alert information in the alert information state 406. Conversely, in other exemplary embodiments, if the exemplary device is in the reading alert information state 406 and a transit passenger presses the audio button 326 once, either during or immediately after the alert information has been played, then the device will transition to the reading route information state 402 via transition line 428.

In some embodiments an odd number of presses, for example 1 or 3 presses of the audio button 326 may transition the exemplary geo-location destination sign audio output from the quiet state 400 to the reading route information state 402 while pressing an even number of presses, for example 2 or 4 presses of the audio button 326 will transition the audio state from the quiet state 400 to the reading alert information state 406. In addition, in such an embodiment, pressing the audio button 5 or more consecutive presses turns the transcription portion (the audio portion) of an exemplary geo-location destination sign to a paused state 404 for a predetermined amount of time, for example 5 to 45 seconds and then after the pause time is complete back to the quiet state 400.

Referring back to FIG. 3, the GPS circuitry 310 in an exemplary geo-location destination sign determines the geographical location of the sign. When an exemplary geo-location destination sign 300 is initially installed at a transit stop location and powered on, the GPS circuit determines the geographical location of the sign. The GPS circuitry 310 may determine the location of the sign in various ways. For example, if the exemplary sign is located in the United States, satellite GPS may be used, but if located, for example, in a European country, the Galileo Satellite System may be used. Additionally, if positioned in Russia, the Glonass System may be used, if in China, the Compass Navigation System may be used and if in India, the Indian Regional Navigation Satellite System may be utilized. Additionally, if no satellites are available the location of the sign may be determined via wireless telephony triangulation assistant GPS or telecom station triangulation techniques. Exemplary embodiments of the present invention can locate the position of the sign with an accuracy of about 3 meters or 9.8 feet and provide such information via the wireless modem to the transit system control center server 108. The controller 302 instructs the wireless communication circuit 306 to contact the transit system control center (TSCC) 108 to provide the geographical location thereto. The TSCC will determine whether the exemplary geo-location sign is located properly on a specified or predetermined transit route. If a sign is located appropriately on the predetermined transit route, then the TSCC 108 will transmit the appropriately calculated route information via a wireless communication network or system to the exemplary geo-location sign for display on the display panels 314. Furthermore, the TSCC 108 may also transmit over a wireless network (or communication system) alert information or other data that is to be displayed on one or more of various sections of the exemplary geo-location sign.

Each exemplary geo-location destination sign 300 is provided with a unique identification indicator or number. The identification indicator or number may be stored in the memory 304. The unique indicator or number is used in communications between an exemplary geo-location destination sign 300 and a TSCC 108. The unique identification or number allows or enables the TSCC 108 to communicate with a specific or selected exemplary geo-location destination sign out in the field and on a transit route. Thus, the TSCC can provide route information for a specific sign location which provides the arriving or arrival time of a transit vehicle as well as connecting information for the same specific geo-location sign. Furthermore, alert information can be provided to a particular geo-location sign (e.g., this transit location will move on a particular date) or to a plurality of the transit location signs to provide a transit system wide alert (e.g., warning: heavy rains and hurricane winds expected after 3 PM).

Furthermore, alarm communications can be sent wirelessly from an exemplary geo-location destination sign to a TSCC. If a geo-location destination sign controller senses that an internal temperature of the sign is above or below a predetermined temperature, if a self check subroutine determines that one or more of the modules or circuits within the geo-location destination sign are not working properly, if there is a power outage and the geo-location destination sign is using auxiliary battery power (not specifically shown), or if the GPS circuitry informs the controller circuitry that the location of the particular geo-location destination sign has changed or is moving, then the controller may provide data over the communication data line 307 to the wireless modem communication circuit 306 so as to communicate with the TSCC to provide the specific alarm situation. A transit operator or staff member operating the TSCC would then be informed by the TSCC of the alarm situation at the specific geo-location destination sign and be able to react accordingly.

Figure 5:
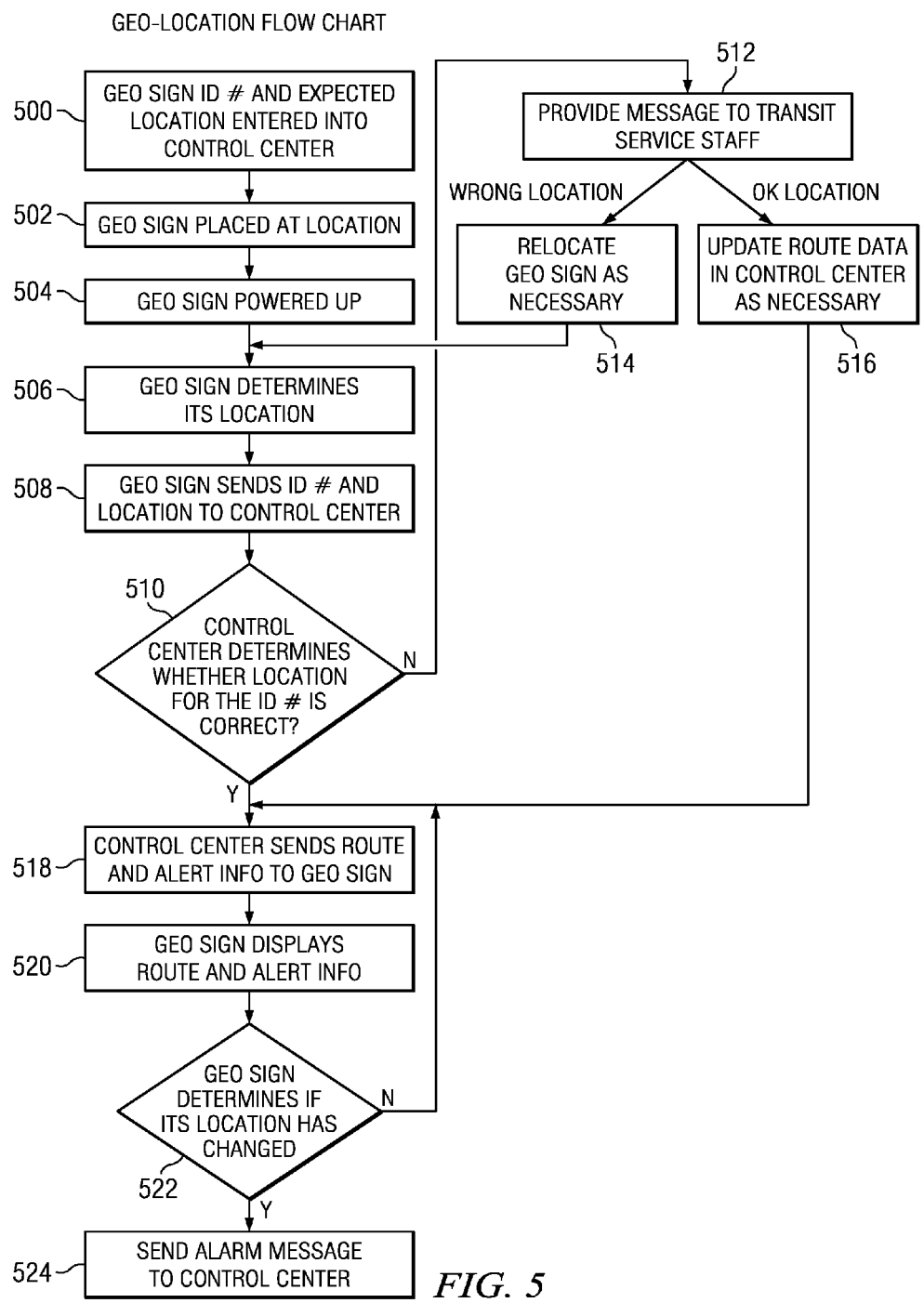
FIG. 5 provides a geo-location destination sign operational flow chart.

Referring now to FIG. 5, a flow diagram of an exemplary geo-location operation and function of an exemplary geo-location destination sign is provided. At step 500, it's determined that a geo-location destination sign is to be installed or placed at a predetermined location on a transit route. The unique identification number or insignia of a geo-location sign and the expected geographical location of the geo-location sign's placement is entered into the transit system control center server. At step 502, the geo-location sign is transported and installed at or near the predetermined location. At step 504, the geo-location sign is powered up and may run through an internal self test to indicate that the system is working properly. At step 506, the GPS circuitry within the geo-location destination sign uses one of various geographical positioning systems available in the region or country where the geo-location sign is being installed. The GPS circuitry determines to within about 3 meters or about 9.8 feet or less the geographical location of the geo-location sign.

At step 508, the geo-location sign sends its ID number and its determined geographical location to the transit system control center server via a wireless communication system or network.

At step 510, the control center receives the ID number and location information from the geo-location sign and determines whether the location provided by the geo-location sign is substantially close to the designated location where the geo-location sign having the particular ID number is supposed to be installed. If it's determined that the particular geo-location sign location is not correct, then at step 512 a message is provided to a transit service staff member who is operating the transit system control center. The message indicates that the designated location for the particular geo-location sign is different from the geographical location where the sign is presently located. The transit service staff member may then decide whether the location is indeed the wrong location or too far away from the intended geographic location or whether the location of the sign is close enough to the intended geographical location. If the sign is determined to be in the wrong location or too far from the intended geographical location, the transit service staff member will instruct an installation crew to relocate or move the geo-location sign as necessary at step 514. Once the geo-location sign is moved as necessary steps 506, 508 and 510 are repeated. Conversely, if the transit service staff member determines that although the geo-location sign is not in or close enough to the predetermined location for the sign, the sign is close enough that it is okay to install the sign at its present location as determined by the geo-location's GPS device, then at step 516 the route data may be required to be updated in the transit system control center database as necessary; and, the geo-location sign is installed where it is at. The system flow then moves to step 518. Going back to step 510, if the transit system control center determines that the present location of the geo-location sign is substantially near the intended geographical location, then the method moves to 518. At step 518 the control center begins to send route and alert information to the newly installed geo-location sign having the particular geo sign identification number and being installed in the predetermined geographic location. At this time and at step 520, the newly installed geo-location sign proceeds to operate in a normal software loop wherein the route information, alert information, and other information is provided to the geo-location sign wirelessly from the transit system control center.

Furthermore, if the audio button associated with the geo-location sign is pressed by a transit patron, the geo-location sign will produce and provide an audible transcription of the verbiage displayed on the display panel (Note: if not specifically displayed at the moment the button is pressed, the verbiage stored within the memory 304 or other memory associated therewith is audibly provided) for the transit patron who pressed the audio button.

At step 524 the geo-location sign determines if its location has changed from the determined location and if there has been a substantial change in the location, then the loop continues back to step 518 and 520. Conversely, if the geo-location sign determines that the location has changed at step 522, then an alarm message is sent to the control center indicating that the geo-location sign has been moved. Additionally, if should be understood that at step 522 other determinations, such as whether powers being provided to the geo-location sign, whether the sign is operating within normal temperature parameters, or other alarm sensed conditions may be determined so as to send an alarm message to the control center at step 524.

Embodiments of the present invention provide a geo-location sign that determines its geographical location and provides its location information to a transit system control center through wireless communication. By doing so, an exemplary geo-location destination sign can be installed at or near its determined location and provide its actual installation location to a transit system control center such that human entry of the geographical location of the sign in the transit system control center is unnecessary. Proper location of the geo-location sign can also be accomplished without human interaction. This simplifies the installation of a destination sign and makes calculations of route information, such as transit vehicle arrival time calculations more accurate and easily calculated automatically via software within the transit system control center. Furthermore, an audio button in accordance with the ADA for visually impaired persons is provided with an exemplary geo-location sign in order to accommodate visually impaired patrons by providing an audible transcription of the verbiage displayed or to be displayed on the sign's display panels in an on-demand basis. The visually impaired patron can press the audio button an even or odd number of times in order to get the information most important to them at the moment. Furthermore, the system is provided with an audible pause state so that avid button pushers, such as children, are deterred from pressing the button multiple times and annoying other transit patrons at the particular transit stop. That is, if the audio button is pressed sequentially in rapid succession a predetermined number of times (such as three or more times in succession), then the audio system will transition to a paused state for a predetermined amount of time after its present state (e.g., reading route information, reading alert information, or being in a quiet state) is completed.

It will be appreciated by those skilled in the art having the benefit of this disclosure that an exemplary geo-location destination sign and methods of using the same provide a geo-location sign that provides installation location to a central system such that it can be determined whether or not the sign has been installed in a correct location, provides the ability for a central system to accurately provide the estimated arrival time of various transit vehicles at the geo-location destination sign's location, provide audible transit route information and alert information to visually impaired transit patrons, as well as provide audio tamper resistant functionality and alerts signals from the geo-destination sign to the transit system control center indicating a potential problem or unapproved removal or movement of the sign a the time when the problem is occurring. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A destination sign comprising:
    a microcontroller with associated memory;
    a wireless communication module, adapted to transmit and receive data on a wireless network, connected to the controller;
    an antenna connected to the wireless communication module;
    a display circuit and display panel configured for displaying display data provided by the microcontroller;
    an audio amp and speaker adapted to produce audible sound in accordance with audio data provided by the microcontroller;
    a single audio button connected to provide a signal to the controller when pressed a predetermined number of consecutive times by a person, wherein the controller is adapted to provide audio data to the audio amp and speaker when the single audio button is pressed, the audio data adapted to produce an audible transcription of at least part of the display data, wherein when the single audio button is pressed a first predetermined number of consecutive times then route information audio data is provided to the audio amp and speaker, and when the single audio button is pressed a second predetermined number of consecutive times then alert data associated with the destination sign's location is provided to the audio amp and speaker; and
    a GPS module configured to determine a geographic location of the destination sign;
    wherein a plurality of instructions stored in the memory are configured to cause the microcontroller to perform:
    storing the geographical location of the destination sign in the memory;
    periodically comparing the stored geographical location of the destination sign with a present geographical location of the destination sign;
    determining whether the destination sign has moved a distance greater than a predetermined distance from the stored geographical location;
    transmitting, via the wireless communication module, an alarm signal along with a destination sign identification data for the destination sign and the present geographical location of the destination sign.

2. The destination sign of claim 1, wherein the memory is adapted to store transit route data received by the wireless communication module.

3. The destination sign of claim 2, wherein the microcontroller is adapted to provide the transit route data to the display circuit as display data.

4. The destination sign of claim 1, wherein the memory is further adapted to store alert data received from the wireless communication module;
    wherein the microcontroller is configured to provide the alert data to the display circuit as display data; and
    wherein the microcontroller is further adapted to provide the alert data as audio data to the audio amp when the single audio button is pressed the second number of times sequentially.

5. A method of installing a destination sign in a transit system having a transit system control center, the method comprising:
    assigning a unique identification data to the destination sign;
    entering the unique identification data and a predetermined geographical location data into the transit system control center;
    placing the destination sign at a first geographical location;
    determining, by a GPS module in the destination sign, a first present geographical location of the destination sign;
    transmitting, by the destination sign via a wireless network to the transit system control center, the unique identification data and the first present geographical location of the destination sign; and
    receiving, by the destination sign via the wireless network from the transit system control center, an indication of whether the first present geographical location of the destination sign is substantially similar to the predetermined geographical location;
        when the indication indicates that the first present geographical location is substantially similar to the predetermined geographical location, then:
        receiving route information by the destination sign via the wireless network;
        displaying the route information on the destination sign for patrons to read; and
        providing, by a audio module in the destination sign, an audible natural language transcription of the route information when a single button associated with the destination sign is pressed a first predetermined number of sequential times by a transit patron and providing a natural language transcription of alert information when the single button is pressed a second predetermined number of sequential times.

6. The method of claim 5, wherein when the indication indicates that the first present geographical location is not substantially similar to the predetermined geographical location, then:
  moving the destination sign to a second geographical location;
  determining, by the GPS module in the destination sign, a second present geographical location of the destination sign;
  transmitting, by the destination sign via a wireless network to the transit system control center, the unique identification data and the second present geographical location of the destination sign;
  receiving, by the destination sign via the wireless network from the transit system control center, an indication of whether the second present geographical location of the destination sign is substantially similar to the predetermined geographical location;
  when the indication indicates that the second present geographical location is substantially similar to the predetermined geographical location, then:
  receiving route information by the destination sign via the wireless network;
  displaying the route information on the destination sign for patrons to read;
  providing a second audible natural language transcription of the route information associated with the second present geographical location when the single button associated with the destination sign is pressed the first predetermined number of times and providing the natural language transcription of the alert information when the single button is pressed the second predetermined number of times.

7. The method of claim 5, further comprising:
  receiving alert information by the destination sign via the wireless network;
  displaying the alert information on the destination sign for patrons to read; and
  providing the audible natural language transcription of the alert information when the single button associated with the destination sign is pressed the second predetermined number of times.

8. The method of claim 5, further comprising transitioning the audio module to a paused state, wherein additional audible natural language transcriptions are not provided for a predetermined amount of time when the single button is pressed at least a third number of consecutive times.

9. The method of claim 5, wherein, the predetermined geographic location is one of a plurality of transit stop locations of at least two different transit vehicle routes and wherein receiving route information by the destination sign via the wireless network further comprises receiving route information for the at least two different transit vehicle routes.

10. The method of claim 5, further comprising:
  periodically checking, by the GPS module in the destination sign, the present geographical location of the destination sign;
  comparing the present geographical location with the first geographical location;
  determining whether the destination sign has moved from the first geographical location; and
  when it is determined that the destination sign has moved from the first geographical location, transmitting via the wireless network, an alarm indication that provides the unique identification data and the present geographical location of the destination sign.

11. A destination sign adapted for installation at a transit vehicle stop, the destination sign comprising:
  a display panel module adapted to display transit vehicle route information to transit patrons;
  a single audio button;
  an audio module configured to produce an audible natural language transcription of the transit vehicle route information;
  a wireless network communication module adapted to receive the transit vehicle route information;
  a controller module connected to the display panel module, the single audio button, the audio module and the wireless network communication module; the controller module comprises a memory, wherein the memory is adapted to store a plurality of instructions that are configured to cause the controller module to perform:
  displaying transit vehicle route information, received by the wireless network communication module, by the display module;
  producing, by the audio module, the audible natural language transcription of the transit vehicle route information on demand when the single audio button is pressed once; and
  setting the state of the audio module to a paused state for a predetermined amount of time when the single audio button is pressed more than a predetermined number of substantially consecutive times; and
  a GPS module configured to determine a geographic location of the destination sign; wherein the plurality of instructions are further configured to cause the controller module to perform:
  storing the geographical location of the destination sign in the memory;
  periodically comparing the stored geographical location of the destination sign with a present geographical location of the destination sign;
  determining whether the destination sign has moved a distance greater than a predetermined distance from the stored geographical location;
  transmitting, via the wireless communication module, an alarm signal along with a destination sign identification data for the destination sign and the present geographical location of the destination sign.

12. The destination sign of claim 11, wherein the transit stop services a plurality of transportation routes and wherein displaying transit vehicle route information comprises displaying transit vehicle route information for the plurality of transportation routes serviced by the transit stop.

13. The destination sign of claim 12, wherein displaying the transit vehicle route information for the plurality of transportation routes comprises displaying transit vehicle route information in a predetermined order.

14. The destination sign of claim 13, wherein the predetermined order is based on the shortest to longest amount of time before a transit vehicle from the plurality of transportation routes will arrive at the transit stop.

* * * * *

UNITED STATES PATENT AND TRADEMARK OFFICE
CERTIFICATE OF CORRECTION

PATENT NO. : 8,976,044 B2  
APPLICATION NO. : 13/458804  
DATED : March 10, 2015  
INVENTOR(S) : Ramin Safavi, Scott R. Watters and Marty Masias Page 1 of 1

It is certified that error appears in the above-identified patent and that said Letters Patent is hereby corrected as shown below:

On the title page, in item (75), please delete the Inventor "Safavi Ramin" and insert --Ramin Safavi--

Signed and Sealed this
Twenty-ninth Day of September, 2015

Michelle K. Lee
*Director of the United States Patent and Trademark Office*